April 10, 1928.
C. J. PATER
1,665,718
EXPANSION JOINT MATERIAL
Filed June 14, 1920
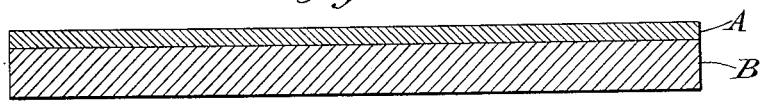
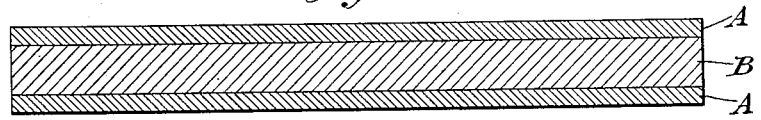
INVENTOR
Curt J. Pater
BY
Kenyon & Kenyon
ATTORNEYS Patented Apr. 10, 1928.

1,665,718

UNITED STATES PATENT OFFICE.

CARL J. PATER, OF WYOMING, OHIO, ASSIGNOR TO THE PHILIP CAREY MANUFACTURING COMPANY, A CORPORATION OF OHIO.

EXPANSION-JOINT MATERIAL.

Application filed June 14, 1920. Serial No. 388,987.

My invention relates to an expansion joint formed in the factory and shipped to be place of application. It is particularly addressed to expansion joints for use in street paving, such as concrete, brick, wood block and similar streets or highways or other places where it is desirable to place at intervals an expansion joint to compensate for the contraction and expansion of the paving, due to variations in temperature. It is desirable that the material of which expansion joints of this character are made should be of such a nature that while possessing the requisite characteristics to serve as an expansion joint, it is capable of being moulded or otherwise formed to the desired shape in the factory. These expansion joints must, when finished, be adapted to be readily handled and packed without adherence to each other, while at the same time being sufficiently board-like to permit of their being installed in place or used as a portion or side of the mould when a concrete pavement is being laid. In this way my expansion joints obviate the necessity of first placing the form or mould in position and then after the concrete is set, removing the mould and placing the joint in the space from which the mould was removed. They also obviate the pouring of joints on the job. In the drawings I have shown two forms of my invention in both of which B is the main body of the joint and A is the reinforcement or non-adhering surface. In carrying out my invention I prefer to use a material plastic in its nature and possessed of the necessary waterproofing and non-deteriorating characteristics such as asphalt, coal tar, candle tar, pine tar, or any other bituminous or suitable hydrocarbon material. This bituminous material may be either a pure asphalt or a composition of asphalts or other bituminous materials or a combination of bituminous and other materials. In the preferred form of my invention I take a quantity of the bituminous material, preferably in excess of fifty per cent, by weight, and combine with it a filler of suitable material, such as asbestos fibre, flax, pulverized coke, lamp black, pulverized charcoal, clay, sand, waste tan bark, grasses, cork, flax or other suitable material. In making the mixture I heat the bituminous material until it is sufficiently fluid to permit of the ready mixing of the filler with it. Then the mixture is formed into the desired shape by moulds or by passing between rollers or in any other suitable manner. I prefer that the filler material used should be a material that is in and of itself waterproof and non-deteriorating or is of such a nature that it will permit itself to be saturated with the bituminous material into which it is mixed so as to make it waterproof and preserve it. Some materials could be used which are not capable of being saturated but which have other qualities, such as elasticity and flexibility, as in the instance of cork mentioned, and these materials when coated with the bituminous material will be protected and will not deteriorate or be affected by the climatic or other conditions arising from the use of the joint. The joint made of this bituminous material containing the filler must be plastic but in order to permit of its ready handling for shipping purposes and for application and use on the job, it is desirable that this plastic mass be provided with some reinforcement for the purpose of strengthening it. This reinforcement may be a bituminous reinforcement made by using a bituminous material which is of a harder consistency or of less plasticity than the plastic mass which it is to reinforce. Such a reinforcement may be obtained by using an asphalt which is harder than the mass to be reinforced or combining an asphalt with some filler which will tend to make it harder and then applying this hard asphalt mixture to the surface of the plastic mass to the desired thickness, thereby giving body and strength to the joint so that it will form a slab or board-like structure capable of being easily handled. A bituminous material could be utilized for this purpose having a much higher melting point than the plastic mass first referred to or one having a much lower penetration than the plastic mass which it is to reinforce. This reinforcing material is applied preferably on the exterior of the plastic mass, although if desired it could be made the core and the plastic mass applied to each side of it. The thickness of this reinforcing material depends upon the thickness of the joint and the thickness of the plastic mass but it must be of sufficient thickness so as to afford the board-like or slab-like characteristics to the final complete expansion joint. I sometimes use in place of the bituminous reinforcement a reinforcement of paper or sometimes combine the paper reinforcement with the bituminous reinforcement by placing the paper on the exterior or between the original plastic mass and the bituminous reinforcement. If desired any material could be used in this way, such as a thin sheet of plain, perforated or expanded metal, suitable fabric, strands of wire or other suitable thin material which while affording reinforcement to the joint does not prevent its use or destroy any of the characteristics that give it value as an expansion joint. At times it may be desirable to place an adhesive coat on the exterior side of the joint and this adhesive coat may be applied at the factory or on the job. The adhesive coat would only be used where it was desirable to give greater adhesion between the joint and adjacent structure, than would be afforded by the natural characteristics of the joint itself. The surface of the joint could, to further prevent adhesion of adjacent joints especially in extremely hot weather, have a layer or exterior coat or dusting of talc, soapstone, mica or any similar suitable minute particles adapted to prevent the adhesion of adjacent joints when packed, etc.

What I claim:

1. An expansion joint formed of a body of bituminous material and a body of harder bituminous material than said first mentioned body, forming a surface for said joint.

2. An expansion joint composed of a body of bituminous material and an exposed surface thereof formed of a body of bituminous material reinforcing said first mentioned body, said reinforcing body having a penetration less than the penetration of said first mentioned body.

3. An expansion joint formed of a plastic mass composed of a bituminous material containing a filler and a layer of bituminous material reinforcing said plastic mass and forming a surface for said joint.

4. A preformed expansion joint formed of a plastic mass composed of bituminous material containing a fibrous filler and a layer of bituminous material reinforcing said plastic mass and forming a surface for said joint.

5. A preformed board-like expansion joint formed of a plastic mass composed of bituminous material containing a filler of vegetable fiber and a layer of bituminous material harder than said plastic mass reinforcing said mass and forming a surface for said joint.

6. A preformed expansion joint formed of a plastic mass composed of a bituminous material containing a filler of grass-like fiber and a layer of bituminous material reinforcing said plastic mass and forming a surface for said joint.

7. A preformed board-like expansion joint formed of a body of bituminous material and a body of harder bituminous material than said first-named body forming a surface for said joint and in contact with said first-named body.

In testimony whereof, I have signed my name to this specification.

CARL J. PATER.